(No Model.) 2 Sheets—Sheet 1.

J. W. BAKER.
GAS LAMP.

No. 334,328. Patented Jan. 12, 1886.

WITNESSES:
John Nolan.
N. Henlow

INVENTOR
John W. Baker,
per Joshua Pusey, atty.

(No Model.)

J. W. BAKER.
GAS LAMP.

No. 334,328. Patented Jan. 12, 1886.

WITNESSES:
John Nolan,
N H Culver

INVENTOR
John W. Baker,
per Joshua Pusey, atty.

UNITED STATES PATENT OFFICE.

JOHN W. BAKER, OF PHILADELPHIA, PENNSYLVANIA, ASSIGNOR TO THE REGENERATIVE GAS LIGHT COMPANY, OF CAMDEN, NEW JERSEY.

GAS-LAMP.

SPECIFICATION forming part of Letters Patent No. 334,328, dated January 12, 1886.

Application filed May 12, 1885. Serial No. 165,198. (No model.)

*To all whom it may concern:*

Be it known that I, JOHN W. BAKER, a citizen of the United States, residing at the city and county of Philadelphia, and State of Pennsylvania, have invented certain new and useful Improvements in Lamps, of which the following is a full, clear, and exact description, reference being had to the accompanying drawings, of which—

Figure 1:
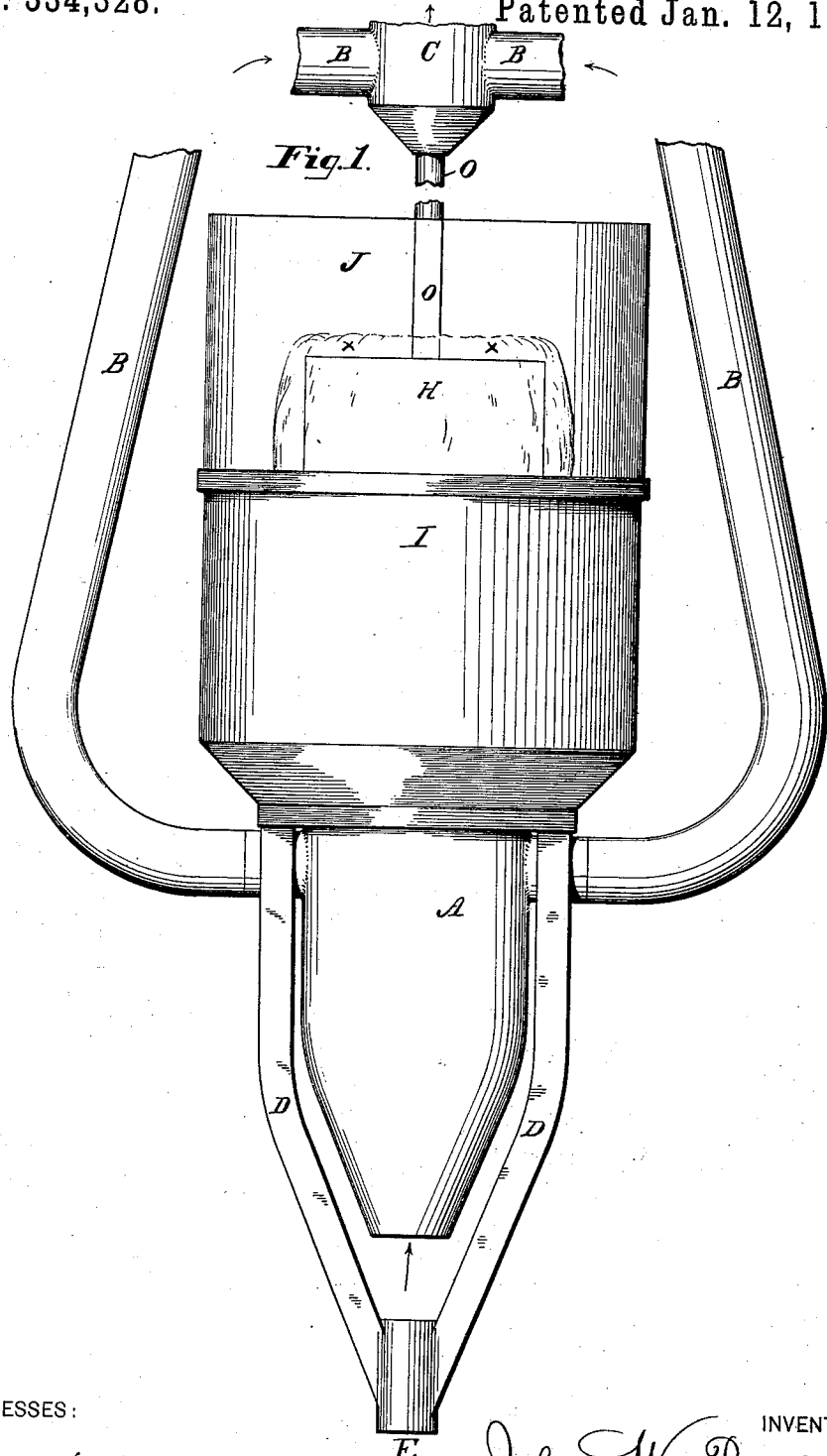
Figure 2:
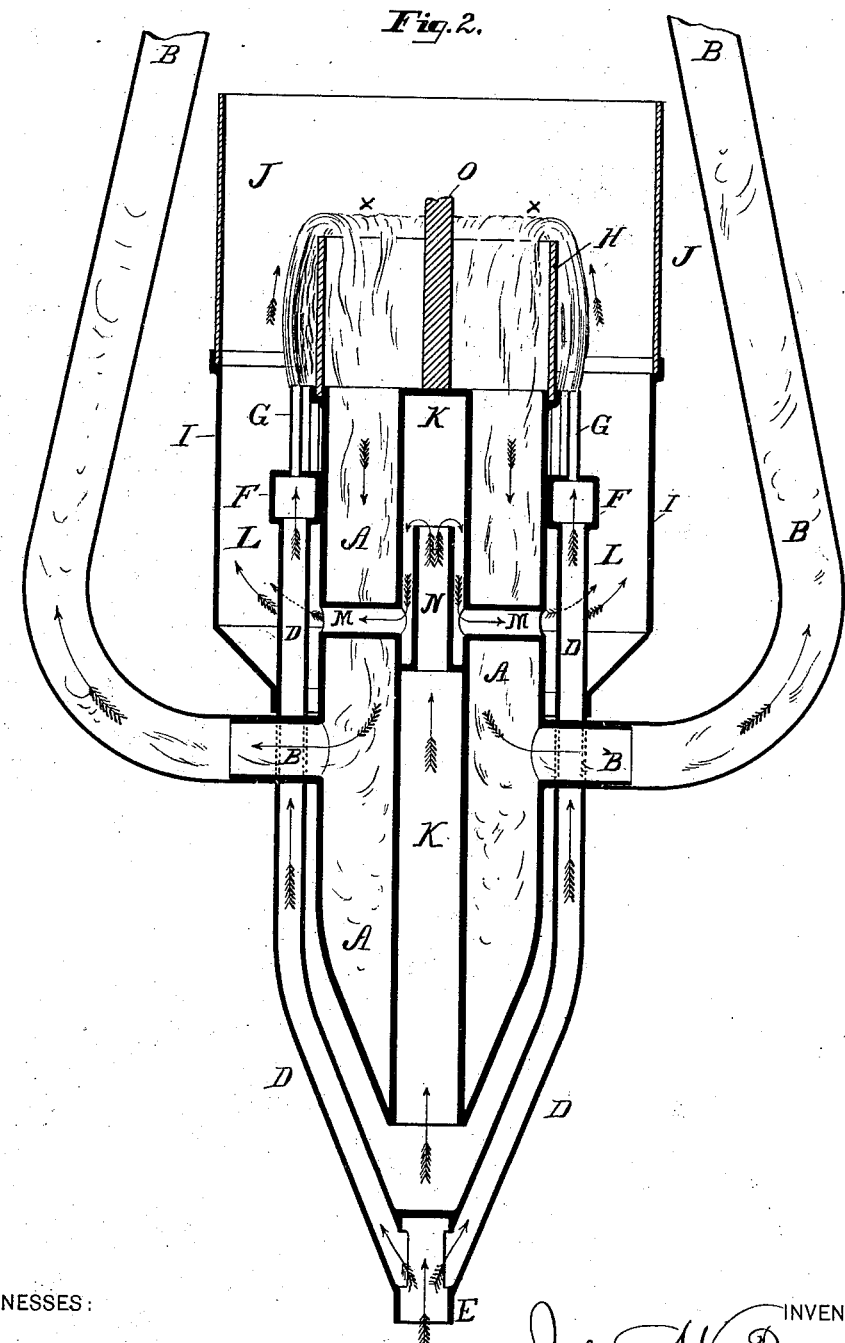

Figure 1 is an elevation, and Fig. 2 a vertical section through the middle.

This invention relates to that well-known class of gas-burning lamps in which the air aiding in the gaseous combustion is highly heated on its way to the flame by the properly-directed products of combustion in seeking their escape into the open air.

The invention consists, mainly, of the combination, with the usual gas-conveying pipes and annular burner and flues for carrying off the products of combustion, of a central conduit, through which the air-supply is drawn, (and at the same time highly heated,) contained in a chamber within the annulus of the burner, together with an external casing for directing the heated air to the flame, the said air-supply conduit being connected, by means of lateral pipes, with the annular space contained within said casing.

It also consists in certain details of construction, as hereinafter fully explained.

The precise character of the improvement will be more clearly understood from the following detailed description of its construction and operation, reference being now had to the annexed drawings.

A is an annular chamber, which constitutes the main body of the lamp and to which the other parts going to make up the latter are attached or connected. Opening into this chamber are lateral flues B, through which ascend the gaseous products of combustion into the main flue C, Fig. 2, communicating directly with the open air, as hereinafter described.

D are pipes, usually four in number, converging into the common tube E, that is applied to the gas-supply pipe running from the ceiling or walls of the building in which the lamp may be located. These pipes D, in the present instance, run upon the outside of the walls of chamber A, as shown, and lead into an annular chamber, F, surrounding the latter.

The flow of gas from chamber F is subdivided by a series of small tubes, G, forming the usual annular or Argand burner. A cylinder, H, of porcelain or other suitable refractory material, rests in a groove upon the summit of the chamber A, while extending around the upper portion of the latter and the burner is the air-directing casing I, having its lower end closed and its upper extremity extending up just below the ring of the flame $x$, (so as not to obscure the light,) and is surmounted by a cylinder, J, of glass, which is, in effect, a translucent continuation of the casing I.

The foregoing parts, going to make up my improved lamp, although essential features of the combination, would, however, be quite useless to accomplish the end in view without the air supply and heating conduit K, now to be described. This consists of a tube substantially concentric with chamber A, its lower extremity communicating with the air and its upper end, which extends up to about the level of the top of burner-tubes G, crossed. Conduit K has direct communication with the space L, contained by the external casing, I, by way of lateral tubes or flues M. In this conduit is inserted a short cylinder, N, of less diameter than that of the former, as shown. It extends some distance above said lateral flues M, and its purpose is to carry the air above the latter and to cause it to be deflected downward against the heated sides of the conduit before it can pass into the said flues. This deflecting may, however, be omitted, although, usually, it is advantageous to use the same. A cylinder, O, preferably solid, of iron or other suitable good conductor, has its lower end resting upon the closed top of conduit K, while its upper end is tightly inserted in an aperture in the conical extremity of the flue C, through which, as previously stated, the products of combustion finally escape. The object of this construction is to cause the heating of the body of air within said flue by conduction, and thus to start the current in motion.

It will be obvious that when the lamp is lit the cylinder O becomes very hot and rapidly imparts its heat to the walls of the flue C, which raises the temperature and sets in motion the air contained within the latter.

Having thus described the general construc- tion and arrangement of the several parts of my invention, I shall now proceed to explain its *modus operandi*, which is as follows: The gas, being turned on escapes by way of tubes D into the chamber F, thence to the small tubes G, and, being lighted, the ordinary draft keeps up the flame momentarily. Cylinder O soon becomes hot, and, as above mentioned, its heat is imparted to the air within flue C. The current is thus started. The air drawn up through the open end of conduit K proceeds on through the short cylinder N; thence up into the upper part of K, whence it is compelled to reverse the direction of its motion, and, descending between the walls of the conduit and cylinder N, proceeds on through the lateral tubes M, and strikes the casing I, which directs the current up to the circle of flame $x$, which flows around and over the porcelain cylinder H. At the same time the products of combustion pass downward through the chamber A; thence, as indicated by the arrows, by way of the said flues B, into the common flue C, which leads to the open air. It will be readily understood that the descending current from the circle of flame at the top of chamber A, surrounding the main part of conduit K, imparts its intense heat to the walls of the latter, which of course heats the air-supply on its way to the burner, which is the final purpose of my invention.

It may be well to explain just here that the diameter of the conduit K is in practice considerably greater in proportion to that of the chamber A than as shown by the draftsman in Fig. 2 of the drawings. In fact, the relative dimensions of the several spaces, chambers, &c., depends upon circumstances, and must be left to the judgment of those skilled in the art to which my invention appertains.

Having thus described my invention, I claim as new and wish to secure by Letters Patent—

1. In a lamp of the class recited, the combination, with an annular burner, of a chamber within the same, open above and closed below, said chamber being surmounted by a cylinder of refractory material, one or more draft-flues communicating therewith, a hollow central air-conduit contained within said chamber, having its lower end open and its upper end closed, a casing surrounding the upper part of the burner, and pipes communicating between the latter and said central air-conduit, all constructed and adapted to operate substantially as and for the purpose set forth.

2. The combination of the annular burner, a chamber, such as A, within the same, a cylinder, such as H, of refractory material surmounting said chamber, one or more draft-flues, such as B, communicating with the latter, a hollow centrally-located air-conduit contained within the chamber, having its lower end open and its upper end closed, an air-deflecting cylinder, such as N, placed within said central air-conduit, an external casing, such as I, leaving a space open above and closed below between it and the walls of said chamber, and pipes, as M, communicating between said space and said central air-conduit, all constructed and adapted to operate substantially as and for the purpose set forth.

3. The combination, with the central air-conduit, the chamber A, casing I, with the communicating pipes M, the burner, the flue C, and the connecting-flues D, of the conductor-cylinder O, substantially as and for the purpose described.

In testimony whereof I have hereunto affixed my signature, this 11th day of May, A. D. 1885.

JOHN W. BAKER.

Witnesses:
JOHN NOLAN,
FRANCIS S. BROWN.